US012196861B2

(12) United States Patent
Thoren et al.

(10) Patent No.: US 12,196,861 B2
(45) Date of Patent: Jan. 14, 2025

(54) UNDERWATER MONO-STATIC LASER IMAGING

(71) Applicant: Raytheon Company, Waltham, MA (US)

(72) Inventors: Matthew D. Thoren, Tyngsboro, MA (US); Andrew M. Piper, Nashua, NH (US); William C. Radzelovage, Londonderry, NH (US); Richard F. Regan, Marblehead, MA (US); Joseph C. DiMare, Somerville, MA (US)

(73) Assignee: Raytheon Company, Tewksbury, MA (US)

( * ) Notice: Subject to any disclaimer, the term of this patent is extended or adjusted under 35 U.S.C. 154(b) by 953 days.

(21) Appl. No.: 17/192,006

(22) Filed: Mar. 4, 2021

(65) Prior Publication Data

US 2021/0278541 A1    Sep. 9, 2021

Related U.S. Application Data

(60) Provisional application No. 62/986,162, filed on Mar. 6, 2020.

(51) Int. Cl.
*G01C 3/08*       (2006.01)
*G01S 7/484*      (2006.01)
*G01S 7/4861*     (2020.01)
*G01S 7/4865*     (2020.01)
*G01S 17/89*      (2020.01)

(52) U.S. Cl.
CPC .............. *G01S 17/89* (2013.01); *G01S 7/484* (2013.01); *G01S 7/4861* (2013.01); *G01S 7/4865* (2013.01)

(58) Field of Classification Search
CPC ........ G01S 17/89; G01S 7/484; G01S 7/4961; G01S 7/4865
See application file for complete search history.

(56) References Cited

U.S. PATENT DOCUMENTS

| 4,434,364 A  * | 2/1984 | Correa ................... G01N 21/64 250/573 |
| 7,830,442 B2 | 11/2010 | Griffis et al. |
| 9,229,108 B2 | 1/2016 | Debrunner et al. |

(Continued)

FOREIGN PATENT DOCUMENTS

| CN | 108363069 A  * | 8/2018 | ............. G01S 17/89 |
| JP | 2012215390 A | 11/2012 | |
| WO | 2014192805 A1 | 12/2014 | |

OTHER PUBLICATIONS

PCT International Search Report and Written Opinion dated Jun. 16, 2021 for International Application No. PCT/2021/020791; 17 Pages.

(Continued)

*Primary Examiner* — Mark Hellner

(57) ABSTRACT

Methods and apparatus for monostatic pulsed time-resolved wide-field-of-view underwater laser imaging. In embodiments, a rotatable optical assembly consisting of a single pyramid mirror and optical ports for each facet is used to both direct a transmitted pulsed laser beam to a target and focus the return signal to a high dynamic range detector, such as a photomultiplier tube, The detector output signal is sampled by a high-speed digitizer and can be processed to generate three-dimensional images.

21 Claims, 17 Drawing Sheets

(56) References Cited

U.S. PATENT DOCUMENTS

2019/0011565 A1* 1/2019 Embry ................ G01S 15/874

OTHER PUBLICATIONS

Boatman, et al., "Naval Mine Countermeasures Finding the Needle in the Haystack," International Dfense Review No. 7, Jul. 26, 1993; 4 Pages.
Stutz, et al. "Handbook of Optical and Laser Scanning," Cambridge Technology, Aug. 2011, 35 Pages.
PCT International Preliminary Report on Patentability dated Sep. 15, 2022 for International Application No. PCT/US2021/020791; 10 Pages.
Non-Final Rejection dated Oct. 10, 2024 in connection with UAE Patent Application No. P6001760/2022, 9 pages.

* cited by examiner

| PRF | | | | | | | | |
|---|---|---|---|---|---|---|---|---|
| | Scan Rate (RPM) | | | | | | | |
| Samp/Line | 500 | 1000 | 1500 | 2000 | 2500 | 3000 | 3500 | 4000 |
| 512 | 21943 | 43886 | 65829 | 87771 | 109714 | 131657 | 153600 | 175543 |
| 768 | 32914 | 65829 | 98743 | 131657 | 164571 | 197486 | 230400 | 263314 |
| 1024 | 43886 | 87771 | 131657 | 175543 | 219429 | 263314 | 307200 | 351086 |
| 1536 | 65829 | 131657 | 197486 | 263314 | 329143 | 394971 | 460800 | 526629 |
| 2048 | 87771 | 175543 | 263314 | 351086 | 438857 | 526629 | 614400 | 702171 |
| 4096 | 175543 | 351086 | 526629 | 702171 | 877714 | 1053257 | 1228800 | 1404343 |

*FIG. 4*

| Average Across-Track Pixel Size (inches) | | | | | | | | |
|---|---|---|---|---|---|---|---|---|
| | Standoff Range (m) | | | | | | | |
| Samp/Line | 2 | 4 | 6 | 8 | 10 | 12 | 14 | 16 |
| 512 | 0.22 | 0.43 | 0.65 | 0.86 | 1.08 | 1.29 | 1.51 | 1.72 |
| 768 | 0.14 | 0.29 | 0.43 | 0.57 | 0.72 | 0.86 | 1.01 | 1.15 |
| 1024 | 0.11 | 0.22 | 0.32 | 0.43 | 0.54 | 0.65 | 0.75 | 0.86 |
| 1536 | 0.07 | 0.14 | 0.22 | 0.29 | 0.36 | 0.43 | 0.50 | 0.57 |
| 2048 | 0.05 | 0.11 | 0.16 | 0.22 | 0.27 | 0.32 | 0.38 | 0.43 |
| 4096 | 0.03 | 0.05 | 0.08 | 0.11 | 0.13 | 0.16 | 0.19 | 0.22 |

*FIG. 5*

| Average Along-Track Pixel Size (inches) | | | | | | | | |
|---|---|---|---|---|---|---|---|---|
| Scan Rate (RPM) | Speed (knts) | | | | | | | |
| | 3 | 4 | 5 | 6 | 7 | 8 | 9 | 10 |
| 500 | 1.82 | 2.43 | 3.04 | 3.65 | 4.25 | 4.86 | 5.47 | 6.08 |
| 1000 | 0.91 | 1.22 | 1.52 | 1.82 | 2.13 | 2.43 | 2.73 | 3.04 |
| 1500 | 0.61 | 0.81 | 1.01 | 1.22 | 1.42 | 1.62 | 1.82 | 2.03 |
| 2000 | 0.46 | 0.61 | 0.76 | 0.91 | 1.06 | 1.22 | 1.37 | 1.52 |
| 2500 | 0.36 | 0.49 | 0.61 | 0.73 | 0.85 | 0.97 | 1.09 | 1.22 |
| 3000 | 0.30 | 0.41 | 0.51 | 0.61 | 0.71 | 0.81 | 0.91 | 1.01 |
| 3500 | 0.26 | 0.35 | 0.43 | 0.52 | 0.61 | 0.69 | 0.78 | 0.87 |
| 4000 | 0.23 | 0.30 | 0.38 | 0.46 | 0.53 | 0.61 | 0.68 | 0.76 |

*FIG. 6*

| Swath Width (meters) | | | | | | | | |
|---|---|---|---|---|---|---|---|---|
| Swath Width | Standoff Range (m) | | | | | | | |
| | 2 | 4 | 6 | 8 | 10 | 12 | 14 | 16 |
| | 2.8 | 5.6 | 8.4 | 11.2 | 14.0 | 16.8 | 19.6 | 22.4 |

*FIG. 7*

| Beam Diameter at Bottom (inches) | | | | | | | | |
|---|---|---|---|---|---|---|---|---|
| Beam Div (mrad) | Standoff Range (m) | | | | | | | |
| | 2 | 4 | 6 | 8 | 10 | 12 | 14 | 16 |
| 0.8 | 0.06 | 0.13 | 0.19 | 0.25 | 0.31 | 0.38 | 0.44 | 0.50 |
| 0.9 | 0.07 | 0.14 | 0.21 | 0.28 | 0.35 | 0.43 | 0.50 | 0.57 |
| 1.0 | 0.08 | 0.16 | 0.24 | 0.31 | 0.39 | 0.47 | 0.55 | 0.63 |
| 1.1 | 0.09 | 0.17 | 0.26 | 0.35 | 0.43 | 0.52 | 0.61 | 0.69 |
| 1.2 | 0.09 | 0.19 | 0.28 | 0.38 | 0.47 | 0.57 | 0.66 | 0.76 |
| 1.3 | 0.10 | 0.20 | 0.31 | 0.41 | 0.51 | .061 | 0.72 | 0.82 |
| 1.4 | 0.11 | 0.22 | 0.33 | 0.44 | 0.55 | 0.66 | 0.77 | 0.88 |
| 1.5 | 0.12 | 0.24 | 0.35 | 0.47 | 0.59 | 0.71 | 0.83 | 0.94 |

*FIG. 8*

| Beam Attenuation Length (BAL) vs. Standoff | | | | | | | | |
|---|---|---|---|---|---|---|---|---|
| | Standoff Range (m) | | | | | | | |
| Water Quality/ BAL (m) | 2 | 4 | 6 | 8 | 10 | 12 | 14 | 16 |
| 0.5 | 4.0 | 8.0 | 12.0 | 16.0 | 20.0 | 24.0 | 28.0 | 32.0 |
| 1.0 | 2.0 | 4.0 | 6.0 | 8.0 | 10.0 | 12.0 | 14.0 | 16.0 |
| 1.5 | 1.3 | 2.7 | 4.0 | 5.3 | 6.7 | 8.0 | 9.3 | 10.7 |
| 2.0 | 1.0 | 2.0 | 3.0 | 4.0 | 5.0 | 6.0 | 7.0 | 8.0 |
| 2.5 | 0.8 | 1.6 | 2.4 | 3.2 | 4.0 | 4.8 | 5.6 | 6.4 |
| 3.0 | 0.7 | 1.3 | 2.0 | 2.7 | 3.3 | 4.0 | 4.7 | 5.3 |
| 3.5 | 0.6 | 1.1 | 1.7 | 2.3 | 2.9 | 3.4 | 4.0 | 4.6 |
| 4.0 | 0.5 | 1.0 | 1.5 | 2.0 | 2.5 | 3.0 | 3.5 | 4.0 |
| 4.5 | 0.4 | 0.9 | 1.3 | 1.8 | 2.2 | 2.7 | 3.1 | 3.6 |
| 5.0 | 0.4 | 0.8 | 1.2 | 1.6 | 2.0 | 2.4 | 2.8 | 3.2 |
| 5.5 | 0.4 | 0.7 | 1.1 | 1.5 | 1.8 | 2.2 | 2.5 | 2.9 |

*FIG. 9*

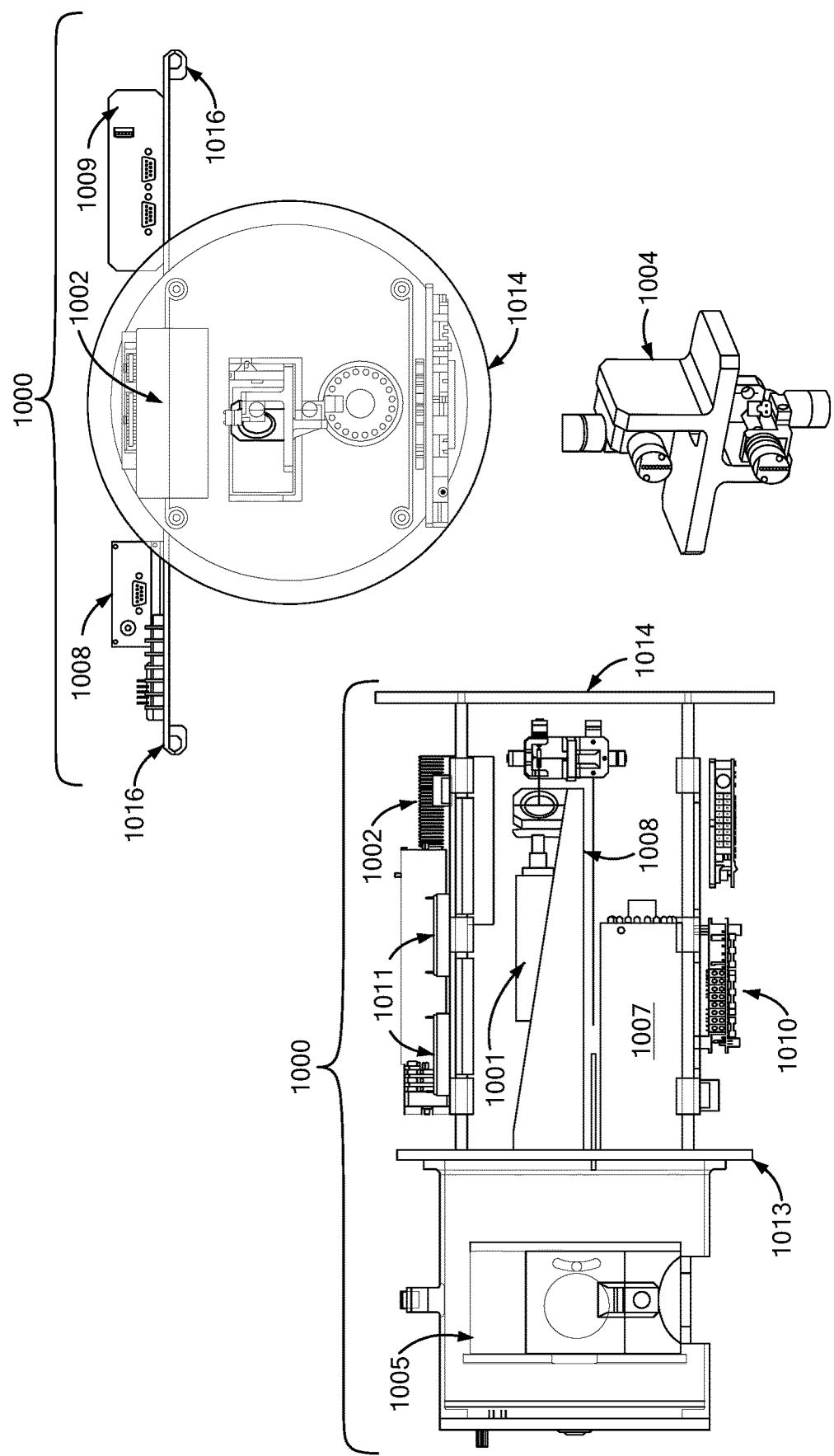

Laser: 1Watt @ 532nm, 350K PRF
Receiver: 1.34" Dia. Optic (0.6 tau), 1.125 S-R Separation
Bottom Reflectance: 25%, Lambertian From Fig. 17

RUN MATRIX TEST CASES

| Imaging Scenario | Case # | Stand off (m) | Water AL (m) | Scat/Abs Ratio | Imaging Atten Length | PHOTON COUNTS ||||
|---|---|---|---|---|---|---|---|---|---|
| | | | | | | Total # Return Photons | Bottom Return from On Target | Bottom Return from Off Target | Scattered/ Bottom Return Ratio |
| SR01p125_RB04_AL2p0 | 1 | 4.0 | 2.00 | 3.87 | 2.0 | 7950056 | 1766668 | 872332 | 2 |
| SR01p125_RB04_AL6p0 | 2 | 4.0 | 0.67 | 6.18 | 6.0 | 298784 | 1612 | 2683 | 69 |
| SR01p125_RB07_AL2p1 | 3 | 7.0 | 3.33 | 2.70 | 2.1 | 10171401 | 941766 | 453018 | 6 |
| SR01p125_RB07_AL5p6 | 4 | 7.0 | 1.25 | 4.98 | 5.6 | 1253905 | 3013 | 3874 | 181 |
| SR01p125_RB09_AL2p3 | 5 | 9.0 | 4.00 | 2.31 | 2.3 | 11060274 | 622093 | 301260 | 11 |
| SR01p125_RB09_AL6p3 | 6 | 9.0 | 1.43 | 4.67 | 6.3 | 1518338 | 634 | 976 | 942 |
| SR01p125_RB12_AL2p4 | 7 | 12.0 | 5.00 | 1.88 | 2.4 | 12881413 | 389993 | 184756 | 21 |
| SR01p125_RB12_AL6p0 | 8 | 12.0 | 2.00 | 3.87 | 6.0 | 2929419 | 917 | 1327 | 1304 |
| SR01p125_RB20_AL2p8 | 9 | 20.0 | 7.14 | 1.27 | 2.8 | 16392627 | 131047 | 60275 | 85 |
| SR01p125_RB20_AL5p8 | 10 | 20.0 | 3.45 | 2.62 | 5.8 | 6718906 | 930 | 1153 | 3225 |
| SR01p125_RB40_AL4p0 | 11 | 40.0 | 10.00 | 0.79 | 4.0 | 19942819 | 8608 | 4265 | 1548 |
| SR01p125_RB40_AL5p6 | 12 | 40.0 | 7.14 | 1.27 | 5.6 | 14992968 | 696 | 584 | 11718 |

*FIG. 17 Cont.*

UNDERWATER MONO-STATIC LASER IMAGING

CROSS REFERENCE TO RELATED APPLICATIONS

The present application claims the benefit of U.S. Provisional Patent Application No. 62/986,162, filed on Mar. 6, 2020, entitled: "UNDERWATER MONO-STATIC LASER IMAGING", which is incorporated herein by reference.

BACKGROUND

The ability to image underwater at high resolution and long standoff ranges is limited fundamentally by the scattering and absorption of light between the imaged scene or object and the imaging system. Scattering dominates signal attenuation in coastal waters while absorption dominates in the open ocean. Scattering limits an imaging system's ability to see objects clearly, while signal attenuation from both scattering and absorption limits the range at which an object can be clearly seen. Employing a laser imaging system across a wide variety of water clarities is also a challenge because the attenuation differences between turbid coastal and clear open ocean water can be many orders of magnitude.

Directed light sources including strobes, flash lamps, and lasers have long been incorporated into imaging systems to illuminate the underwater scene. These light sources increase the number of photons received from the object thus overcoming some of the attenuation losses and the adverse impact of scattered ambient light. However, these sources also generate a near-field backscatter signal that can overwhelm all other signals if not accounted for in an imaging system's design.

Some conventional underwater laser imaging systems employ blue green or green lasers. There are a number of fundamental approaches to laser-based underwater imaging, each providing its own strategy to mitigate the impacts of near-field backscatter, forward scattering of light returning from an object to the imaging system, and the range of signal attenuation encountered.

One known approach is 3D Flash LiDAR (Light Detection and Ranging). To create a three-dimensional frame of data, this architecture illuminates a volume of water with a single expanding flash of light and samples the return with a high-speed camera. The most sophisticated versions sample the entire 2-dimensional return signal in sub-nanosecond intervals (light travels ~9" per nanosecond in seawater) and then employ signal processing across the temporal sequence of camera frames to find the range and amplitude of the object/ocean bottom return signal at each imaged pixel in the scene. From this a two-dimensional (2D) or three-dimensional (3D) image of the scene can be generated at a frame rate dictated by the flash rate of the light source. This approach attempts to mitigate the impact of back- and forward scattering by temporal means as the signal processing ignores all return signals except those from a detected bottom return at each pixel location in the camera's Focal Plane Array (FPA) output. A shortcoming of this temporal-only approach is that the aperture is wide open in two dimensions and thus the extracted object/bottom return signals contain a high ratio of scattered (signal confusing) to non-scattered (information containing) photons. As water quality decreases, this ratio worsens faster than it does for the other two architectures and as a result, the 3D Flash LiDAR's standoff range for high quality imaging is substantially less than that of the other architectures. The utility of this approach is also limited because of its reliance on an FPA. Even with advanced electronic circuitry, the range of input signals that can be supported by an FPA does not cover the broad range of water attenuation conditions and desired imaging standoff ranges the imaging system may encounter.

A second architecture is Streak Tube Imaging LiDAR. This architecture uses a flash laser to transmit a narrow fan-shaped beam. The return is imaged across a row of pixels in an FPA. The beam is electro-statically deflected in the FPA column direction so that each row's output contains a new slice in time of the return. Signal processing extracts range and amplitude information for each pixel. Each laser flash yields a row of down-looking pixel data. Combined with forward platform motion, the STIL outputs a waterfall of image rows that presents an operator with continuously scrolling amplitude and/or range images of the object/ocean bottom. This approach attempts to mitigate the impact of back- and forward scattering by both temporal and spatial means. Its receiver aperture is a long narrow slit which reduces the ratio of the scattered to non-scattered photons relative to the 3D Flash LiDAR approach and as a result can image clearly at greater standoff ranges for any given coastal water condition. As is the case with the 3D Flash LiDAR, STIL relies on an FPA-based receiver and thus is limited in the water conditions it can effectively operate in at useful standoff ranges.

A third known architecture is Laser Line Scan (LLS). This approach has two existing configurations that have been put into practice. The first and original configuration employs a narrow "pencil" beam Continuous Wave (CW) laser, a small "pinhole" receiver aperture, and a high dynamic range Photo-Multiplier Tube (PMT) as the photosensitive receiving element instead of an FPA. A mirror system is used to scan the pencil beam and the pinhole synchronously across the ocean floor and the PMT converts the photons that make it through the aperture into an electrical signal that is amplified and digitized at a desired image pixel rate. Each rotation of the mirror system provides one line of imagery per mirror facet. As with the STIL, forward platform motion is required so that each scanned line covers new ground with imagery displayed in a continuously scrolling waterfall. Unlike STIL's 3D capability, however, it can only provide amplitude imagery because it does not used a pulsed laser and high-speed sampling of the pulse return. This configuration attempts to mitigate the impact of back- and forward scattering by spatial means only—the transmit and receive mirrors are separated by over a foot to avoid direct backscatter and the aperture opening is reduced to a pinhole which is elongated in one direction to provide depth-of-field since the Source-Receiver (S-R) separation requires the receiver to look back to where the transmit beam intersects the ocean floor. This approach is at least as effective as the STIL in reducing the ratio of the scattered to non-scattered photons relative to the 3D Flash LiDAR approach and its use of a PMT enables it to receive a greater range of input signals with lower noise than can be supported by an FPA-based receiver. This enables it to operate at effective standoff ranges for a broader set of water conditions than can either the STIL or the 3D Flash LiDAR. CW LLS is, however, more susceptible to scattered ambient light and its imaging performance will be reduced when operating in poorer-water daylight conditions.

The second LLS configuration is similar to the first except it replaces the CW laser, the amplification and lower-speed digitizing electronics, and a lower bandwidth PMT with a narrow pulse high repetition rate pulsed laser, a high-speed (sub-nanosecond) digitizer, and a high bandwidth PMT. In this configuration, a short laser pulse is transmitted and a high-speed digitizer samples the return signal from a high bandwidth PMT. Digital signal processing extracts amplitude and range from the digitized time sequence of the object/bottom return signal.

This approach generates 3D imagery and is termed "3D Pulsed-Time-Resolved LLS" or "3D PTR LLS." It employs both spatial and temporal means to effectively mitigate the impacts of back- and forward scattered light and, for a given laser power, is capable of higher resolution imaging at substantially greater standoff ranges than 3D Flash LiDAR and STIL in all water conditions.

Although they offer imaging performance improvement versus other architectures, one drawback of the LLS configurations is the large S-R separation needed to mitigate the impact of direct near-field backscatter. This separation has two consequences. First, as mentioned above, it results in the elongation of the pinhole aperture and thus allows in more scattered photons than the optimal pencil-beam/pinhole architecture. Second, it drives the size and weight of the imaging system up making it incompatible with smaller unmanned/autonomous underwater vehicles (UUV/AUVs) which are an emerging platform for laser imaging sensors.

SUMMARY

Embodiments of the disclosure provide methods and apparatus for a compact PTR laser imaging system having transmit and receive optical paths that share a common scanning mirror, high speed electronic gating of the receiver's PMT to attenuate the direct near-field backscatter signal, high-speed PMT output digitizing to generate a time sequence for each laser pulse return, and signal processing to extract range and amplitude information from each time sequence.

In embodiments, a Mono-Static 3D PTR LLS underwater imaging sensor approach employs spatial and temporal processing to mitigate maximally the impact of back- and forward scattering thus, yielding an underwater laser imaging approach that can generate clearer imagery at longer ranges for a given laser power than existing architectures. Additionally, example embodiments enable a compact low power sensor design compatible with 12.75 inch or more diameter UUVs/AUVs, although more compact scaled down versions are also feasible In one aspect, a three-dimensional laser line scan imaging system having a field of view (FOV), comprises: a pulsed laser transmitter to illuminate the FOV; a rotatable optical scanner having a pyramidal mirror to reflect the transmitted laser pulses to a target in the FOV and to reflect signal return from the target in the FOV; a PMT-based detector to detect the signal return and generate a PMT output; and a processor and memory configured to process the PMT output.

A system can include one or more of the following features: the system is contained within an unmanned/autonomous underwater vehicle, the unmanned/autonomous underwater vehicle has an outer diameter of at least 12.75", the transmitter comprises a compact blue-green pulsed laser, with pulse repetition frequency (PRF), beam divergence angle, pulse duration, pulse energy uniformity, and pulse peak energy selected for desired characteristics of the signal return, the rotating optical scanner provides for a 70 degree cross-track FOV and comprises a single four-facet pyramidal mirror in a rotating housing with four optical ports, one for each of the pyramid facets, each of the facets and the ports support separate and non-overlapping optical paths for both an outgoing transmit beam and an incoming optical return ray bundle, the processor is configured to extract range and amplitude pixel data from the PMT output to form 3D images of the target, the target comprises a sea floor, and the 3D images are formed from time-sequential digitized samples of the PMT output corresponding to the return signal from each laser pulse.

In another aspect, a method comprises: selecting a field of view (FOV) for a three-dimensional laser line scan imaging system for unmanned/autonomous underwater vehicle; illuminating the FOV with a pulsed laser transmitter; employing a rotatable optical scanner having a pyramidal mirror to reflect the transmitted laser pulses to a target in the FOV and to reflect the signal return from the target in the FOV to a detector; employing a PMT-based detector to detect the signal return and generate a PMT output; employing a high-speed digitizer to sample the PMT output, and processing the digitized output to create 3D imagery.

A method can further include one or more of the following features: the system is contained within an unmanned/autonomous underwater vehicle, the unmanned/autonomous underwater vehicle has an outer diameter of at least 12.75", the transmitter comprises a compact blue-green pulsed laser, with pulse repetition frequency (PRF), beam divergence angle, pulse duration, pulse energy uniformity, and pulse peak energy selected for desired characteristics of the signal return, the rotating optical scanner provides for a 70 degree cross-track FOV and comprises a single four-facet pyramidal mirror in a rotating housing with four optical ports, one for each of the pyramid facets, each of the facets and the ports support separate and non-overlapping optical paths for both an outgoing transmit beam and an incoming optical return ray bundle, the processor is configured to extract range and amplitude pixel data from the PMT output to form 3D images of the target, the target comprises a sea floor, and the 3D images are formed from time-sequential digitized samples of the PMT output corresponding to the return signal from each laser pulse.

BRIEF DESCRIPTION OF THE DRAWINGS

The foregoing features of this invention, as well as the invention itself, may be more fully understood from the following description of the drawings in which:

FIG. 4 shows example laser Pulse Repetition Frequencies (PRFs) resulting from a range of possible scan rates and common display pixel per line options;

FIG. 5 shows an example average across-track (in the direction of scan) pixel Ground Sample Distance (GSD) in inches as a function of laser pulses per scan line and imaging standoff range;

FIG. 6 shows an example average along-track (in the direction of vehicle motion) pixel GSD in inches as a function of scanner rotation rate and vehicle forward speed;

FIG. 7 shows an example across-track swath width as a function of standoff range given the 70-degree scan line extent;

FIG. 8 shows example beam diameters at various imaging ranges for example laser divergences;

FIG. 9 shows example operating ranges of monostatic 3D PTR LLS in various water clarities;

FIGS. 10A-C show components of an example embodiment of a monostatic 3D PTR LLS Internal Sensor Assembly (ISA);

DETAILED DESCRIPTION

Figure 1:
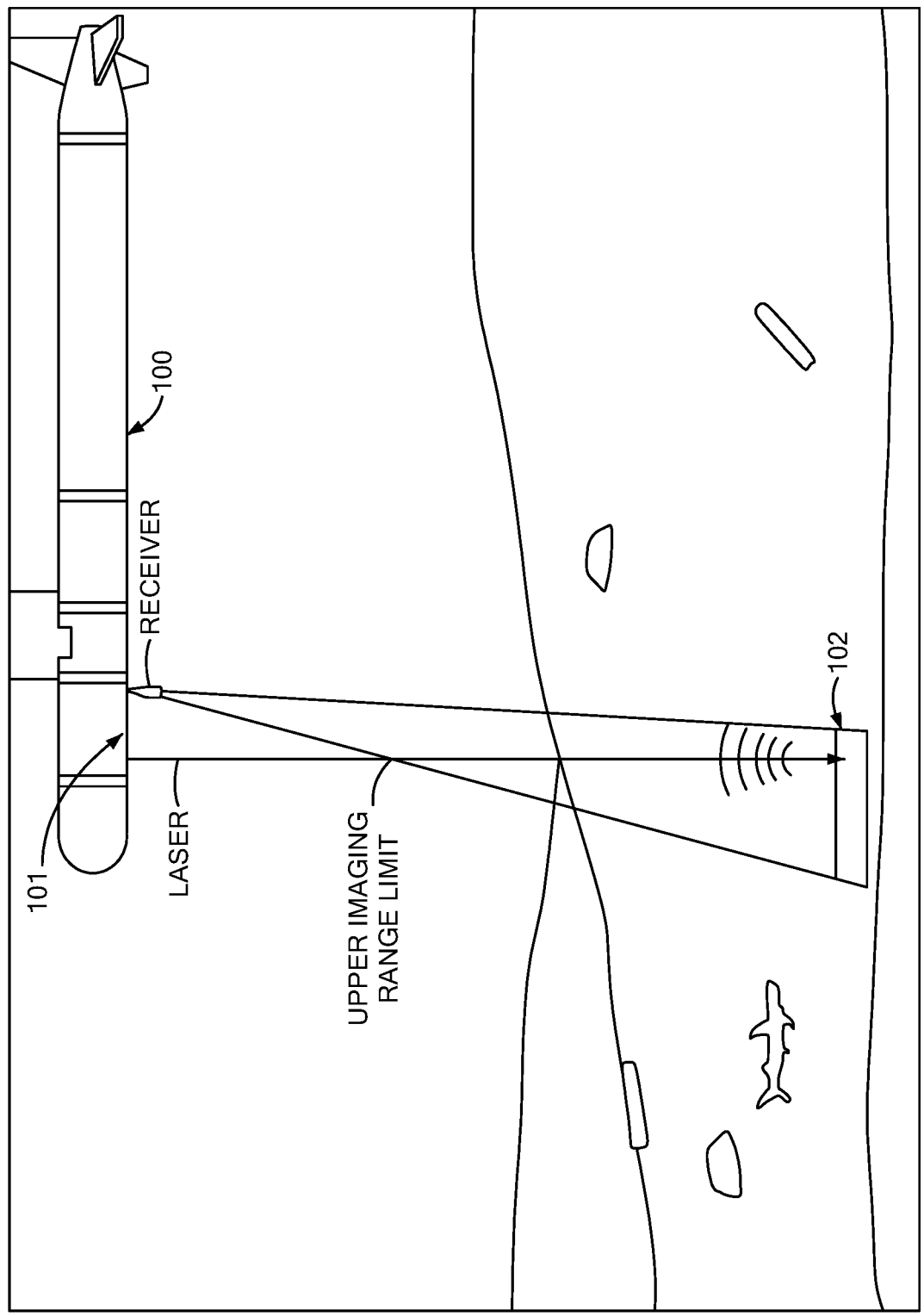
FIG. 1 is a schematic representation of an underwater vehicle having a laser imaging system.

FIG. 1 shows an example underwater vehicle 100 having a laser imaging system 101 for generating an image of a seabed 102 and any objects on or about the seabed. In the illustrative figure, a bi-static version of an LLS sensor is shown with a separation between a transmitted laser beam and the receiver. The shaded area 103 emanating from the receiver is the projection of its instantaneous Field-of-View onto the ocean floor. In a bi-static configuration, the receiver aperture is elongated slightly in the vehicle's along-track direction to provide depth of field as the receiver is canted forward a few degrees to optimally receive the reflected laser return.

Figure 2:
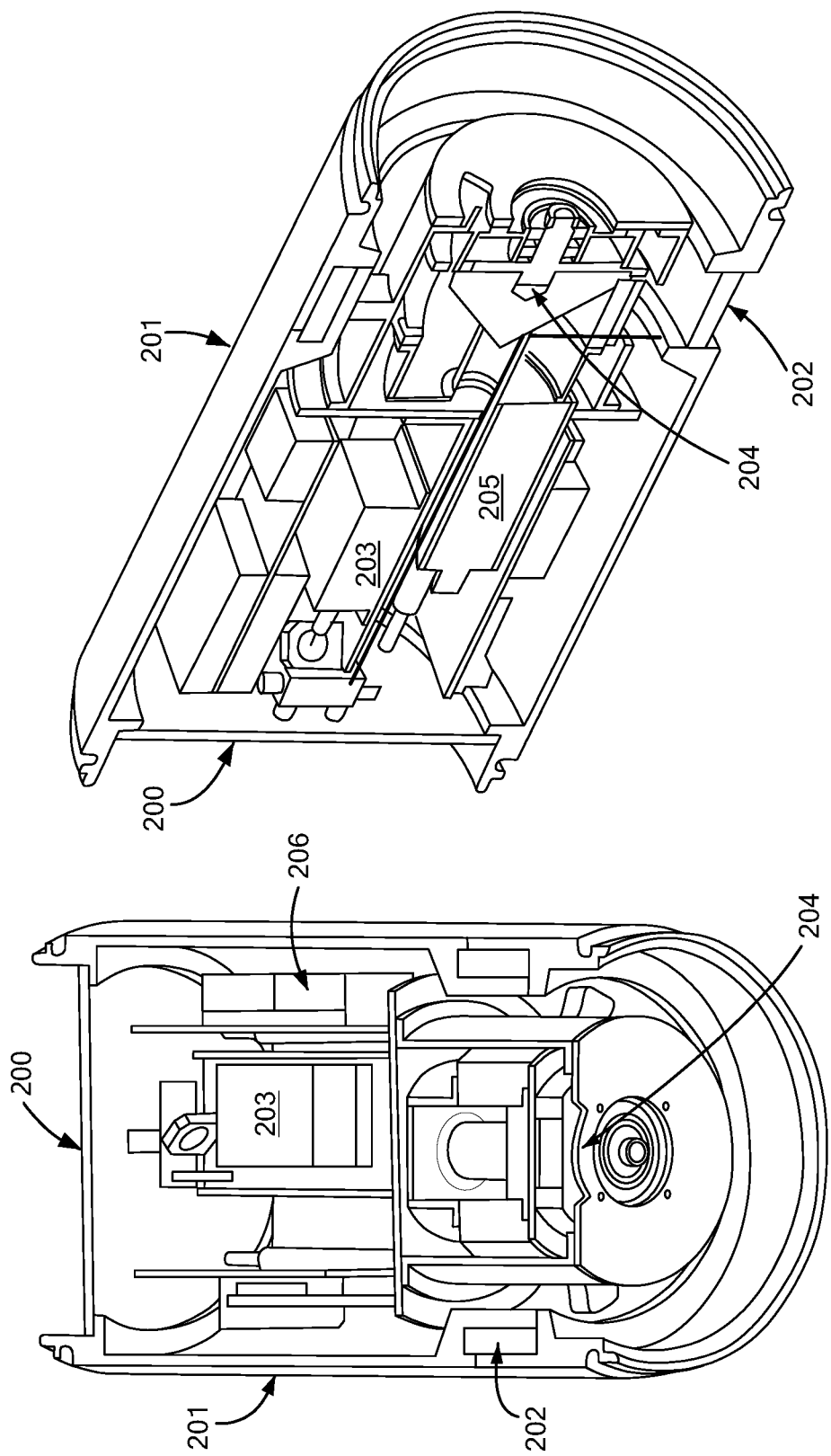
FIG. 2 shows cross-sectional views of a monostatic 3D PTR LLS sensor packaged for compatibility with an example ~12" diameter UUV/AUV.

FIG. 2 shows cross-sectional views 200 of an example embodiment of a Monostatic 3D PTR LLS sensor packaged for compatibility with an example ~12" diameter UUV/AUV. The sensor is contained within an aluminum pressure vessel (PV) 201. The PV 201 has a cylindrical optical window 202. Internal components include a pulsed blue-green laser transmitter 203, a rotating optical scanner assembly 204, and a detector assembly comprising a photomultiplier tube (PMT) 205 and a high-speed digitizer/signal processor 206.

Figure 3:
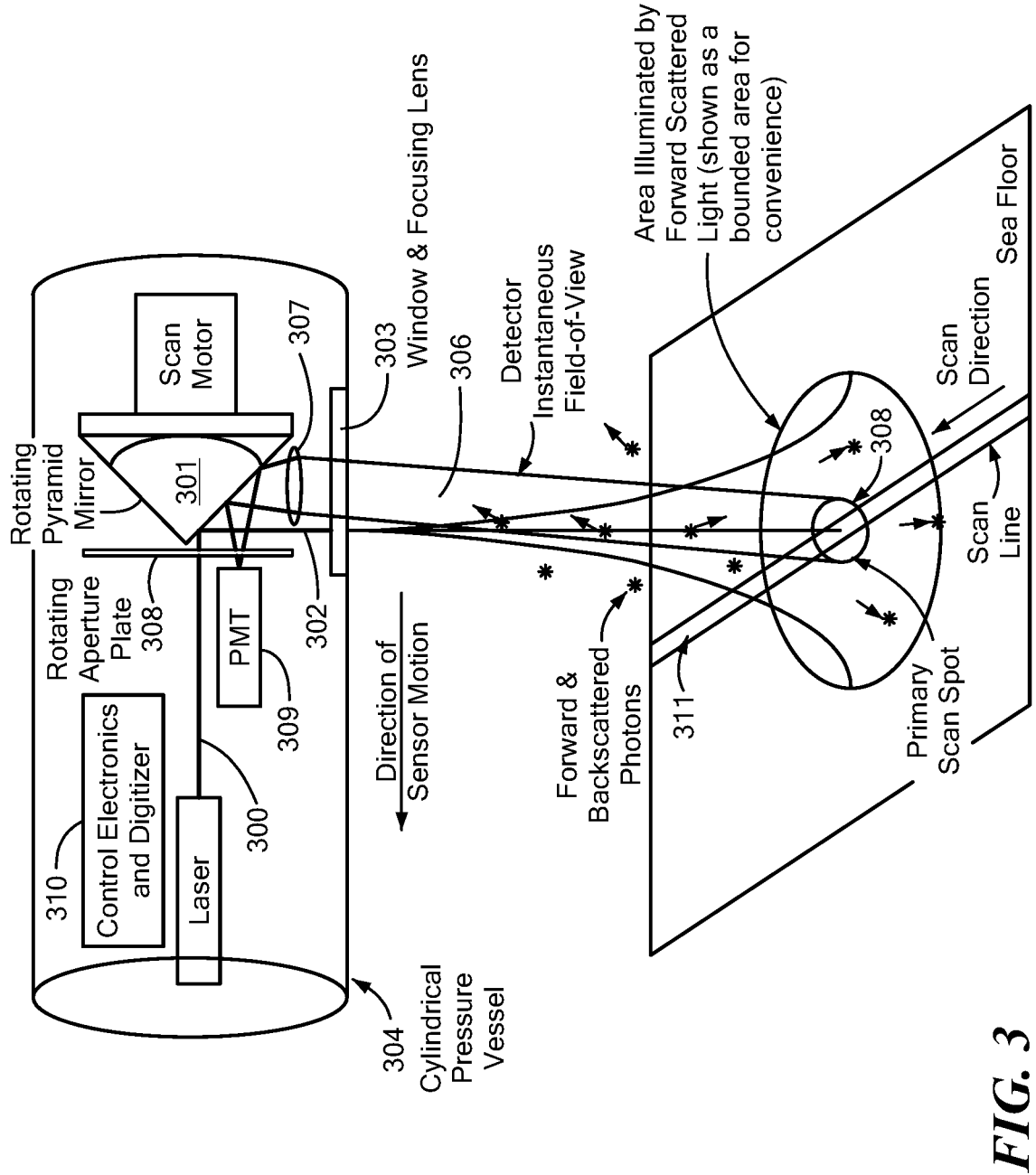
FIG. 3 is a drawing of a monostatic LLS architecture showing imaging of the ocean floor.

In operation, as shown in FIG. 3, a pulsed laser beam 300 is directed onto a rotating scan mirror 301. In embodiments, the mirror 301 comprises a 4-facet pyramid that reflects the laser beam downward such as toward the ocean floor. It is understood that the PV 304 can be rotated such that the reflected laser beam 302 can be directed in any practical direction to meet the needs of a particular application. The system is not limited to looking downward or operating in seawater. The laser beam passes through a window 303 in the sensor's cylindrical PV 304 and reflects off the ocean floor 305. A small portion of the beam 306 reflects back toward PV 304, and passes through the window 303 to a focusing lens 307. As the beam focuses, it reflects off the scan mirror 301 and, when best focus occurs, passes through a small hole in an aperture plate 308 onto a PMT 309. The PMT 309 output can be converted to a time sequence by a digitizer 310. The time sequence is processed to extract range and amplitude for a single image pixel, as described more fully below. As the scanner 301 rotates, the reflected beam 302 laterally transverses the ocean floor. The scan mirror 301, the focusing lens 307, and the aperture plate 308 all rotate together while the PMT 309 and window 303 are fixed in position. Each 90 degrees of scanner 301 rotation becomes a scan line 311 of received laser return. Forward motion of the host platform (e.g. UUV/AUV) places successive scan lines over new volumes of water leading to a continuous waterfall display of imagery. The scan width in degrees depends on the size and positioning of the window 303, the focusing lens 307, the scan mirror 301, and the PMT 309. For wide angle imaging applications, scan widths of 70 degrees out of each facet's 90 degrees of rotation are achievable.

In embodiments, the laser pulse transmitter is provided a commercial off—the shelf (COTS) pulsed blue-green laser. The laser pulse repetition frequency (PRF) is sufficiently high that it provides a pulse per pixel for the waterfall imagery display. The PRF selected may be a function multiple factors that depend on the specifics of the application. In selecting a PRF, the primary drivers for an application include the desired pixel spacing (ground-spatial distance-GSD) within and across scan lines, waterfall format (displayed pixels per scan line), and vehicle forward speed and imaging standoff ranges which together determine the sensor's area coverage rate. The range of values that can be obtained in practice are limited by sensor design parameters which include scan mirror 301 rotation rate and the laser beam 302 divergence assuming the GSD is more or less matched to the beam diameter at the standoff range. Average laser power, power per pulse, maximum energy per pulse, and pulse duration also play a role and are discussed later as they factor into imaging quality as a function of water clarity.

In operation, FIG. 4 provides example PRFs resulting from a range of possible scan rates and common display pixel per line options. A general rule of thumb for imaging in littoral waters is to operate the sensor at the highest laser PRF for which the maximum energy per pulse obtains.

FIG. 5 provides example average across-track (in the direction of scan) pixel GSD in inches as a function of laser pulses per scan line and imaging standoff range. Note that a 2-16 meter imaging standoff range is shown-actual imaging range can vary from <3 m to ~60 m depending on water clarity.

FIG. 6 provides example average along track (in the direction of vehicle motion) pixel GSD in inches as a function of scanner rotation rate and vehicle forward speed.

FIG. 7 provides example across-track swath width as a function of standoff range given a 70-degree across-track scan line extent.

Taken together, FIG. 5, FIG. 6, and FIG. 7 enable a sensor user to determine sensor settings (e.g., PRF, scan rate, pixels per scan line) and engagement geometry (vehicle speed and imaging standoff range) to achieve a GSD and area coverage rate required for any given application. In addition, FIG. 8 provides the beam diameter at various imaging ranges for typically available COTS laser divergences. These diameters can be compared to the GSDs in FIG. 5 and FIG. 6 to determine if image quality is GSD-limited or resolution limited.

In embodiments, other laser parameters that affect performance include pulse duration, pulse-to-pulse uniformity, and pulse energy. A pulse duration may be bounded by the PMT rise time, digitizer sampling rate (the higher the better), and/or the desired range resolution (light travels ~9 inches per nanosecond in seawater). Lower PMT rise times and higher sampling rates can accommodate shorter duration pulses, which together with advanced signal processing yield superior range resolution. Range resolution obtainable with currently available COTS components is ~0.25" employing a PMT rise time of 0.7 ns, a digitizer sampling rate of 2 Gsps (Giga-10^9-samples per second) at 14 bits/sample, and a laser pulse duration (full width half max) of ~2.5 nanoseconds. An example design rule of thumb is that the digitizer should provide at least 5 samples per laser pulse duration to keep pulse-to-pulse sampling noise at a manageable level (<2-3%).

Pulse-to-pulse energy and peak power uniformity are factors in system performance because each pulse return corresponds to a single pixel of imagery and thus pulse-to-pulse peak and energy differences translate to uncorrelated noise in the range and amplitude images. Non-uniformities of a few percent (<1% RMS) are desired. Image noise from higher non-uniformity lasers can be mitigated by applying scaling factors derived from high speed sampling of the outgoing transmit pulse.

Pulse energy may be bounded by available host vehicle power/energy, as well as packaging volume and thermal management constraints. 532 nm Laser average powers up to ~1 W (2.9 µJ/pulse at 350 KHz PRF) should support example compact 3D PTR LLS configurations compatible with 12" UUV/AUVs payload sizes and available mission power and energy. Higher power (20 W+; 28.6 µJ/pulse at 700 KHz PRF) pulsed lasers are available but may only be compatible with much larger systems and host platforms, which can provide more volume for thermal management.

In operation, the energy per pulse is also a factor in imaging standoff range. The ability of a pulse of laser light to travel through a scattering and absorbing medium, such as seawater, is a function of water clarity, which can be measured in terms of Beam Attenuation Length (BAL). One BAL is the path length a laser pulse travels before its energy reduces to 1/e of its original value due to a combination of absorption and scattering. Approximate rules-of-thumb for the BAL in various environments are:

Turbid Littoral Waters: <1 m
Median Littoral Waters: 1.5-2 m
Clear Littoral Waters: 3-5 m
Open Ocean Waters: 7-10+m As noted above, 3D PTR LLS is one of a number of underwater imaging sensor architectures having a scanned pencil beam-pinhole architecture well suited for mitigating the impacts of scattered light, which is the primary driver of BAL in littoral waters. Performance prediction modeling of Monostatic 3D PTR LLS indicates an ability to generate high quality imagery at ~4.5-5 BALs without gating of the PMT or at ~6-6.5 BALs with gating of the PMT. PMT gating is discussed below in conjunction with FIG. 15.

FIG. 9 shows illustrative operating ranges of example Monostatic 3D PTR LLS embodiments in various water clarities. Unshaded cells are without gating, light gray shaded cells show the added operating environment with gating, and performance in the darker gray shaded cell region is not achievable without substantial increases in pulse energy and/or PMT gating efficiency. The FIG. 9 estimates are for a 532 nm pulse energy of 2.9 µJ (1 W average power @ 350 KHz PRF). As mentioned above, this can be achieved with compact COTS lasers compatible with ~12" diameter UUV/AUVs operations. For larger platforms, increasing average laser power to 10 W or 20 W can improve performance by up to ~1.5 BAL (particularly in clearer absorption-limited waters).

Figure 10C:
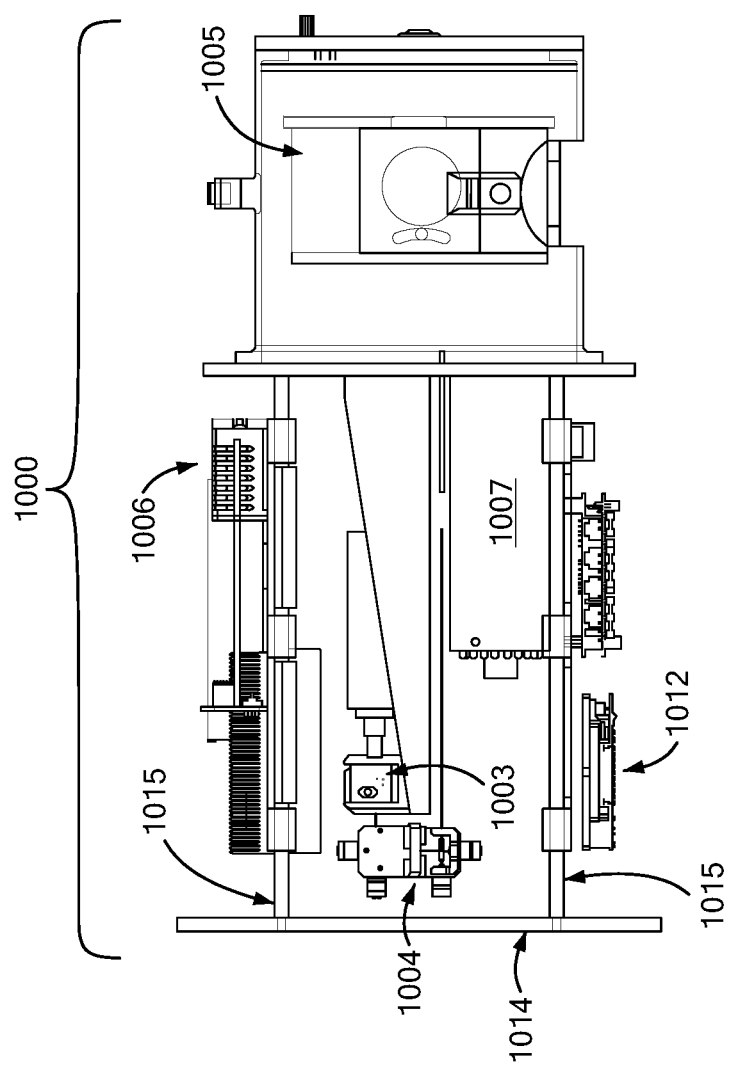

FIG. 10A is a first side view, FIG. 10B is a front view, and FIG. 10C is a second side view (opposite of the first side view of FIG. 10A) showing components of an example embodiment of a Monostatic 3D PTR LLS Internal Sensor Assembly (ISA) 1000. The ISA consists of transmit, scan, receive, embedded control, and power distribution subsystems.

In embodiments, the transmitter comprises a laser head 1001, the laser electronics with heatsink 1002, a beam sampling assembly 1003, and a beam directing turn prism assembly 1004. The scanner comprises a rotating optical assembly inside a housing 1005 and a digital scan motor controller 1006. The receiver comprises a PMT with bias network 1007, a High Voltage Power Supply (HVPS) 1008, and a digitizer with an FPGA 1009 to perform the digital signal processing needed to convert the sampled PMT output into range and amplitude pixels for display. The embedded controller (EC) 1010 is a single board computer that controls the overall operation and time synchronization of the scanner 1005 and the digitizer 1009. The EC 1010 also communicates with an external mission and payload control computer (not in embodiments) and data storage (not in embodiments) located off sensor in the host UUV/AUV. Power distribution comprises power converters 1011 and power supply 1012 the details of which depend on the power available from the host UUV/AUV platform and on the power needs of the various sensor components. Key structural elements include bulkhead plates 1013 and 1014, structural rods (quantity 4) 1015, the laser head platform shelf 1016, and hinged rotating component mounting wings supporting access to optical components for alignment.

Figure 11:
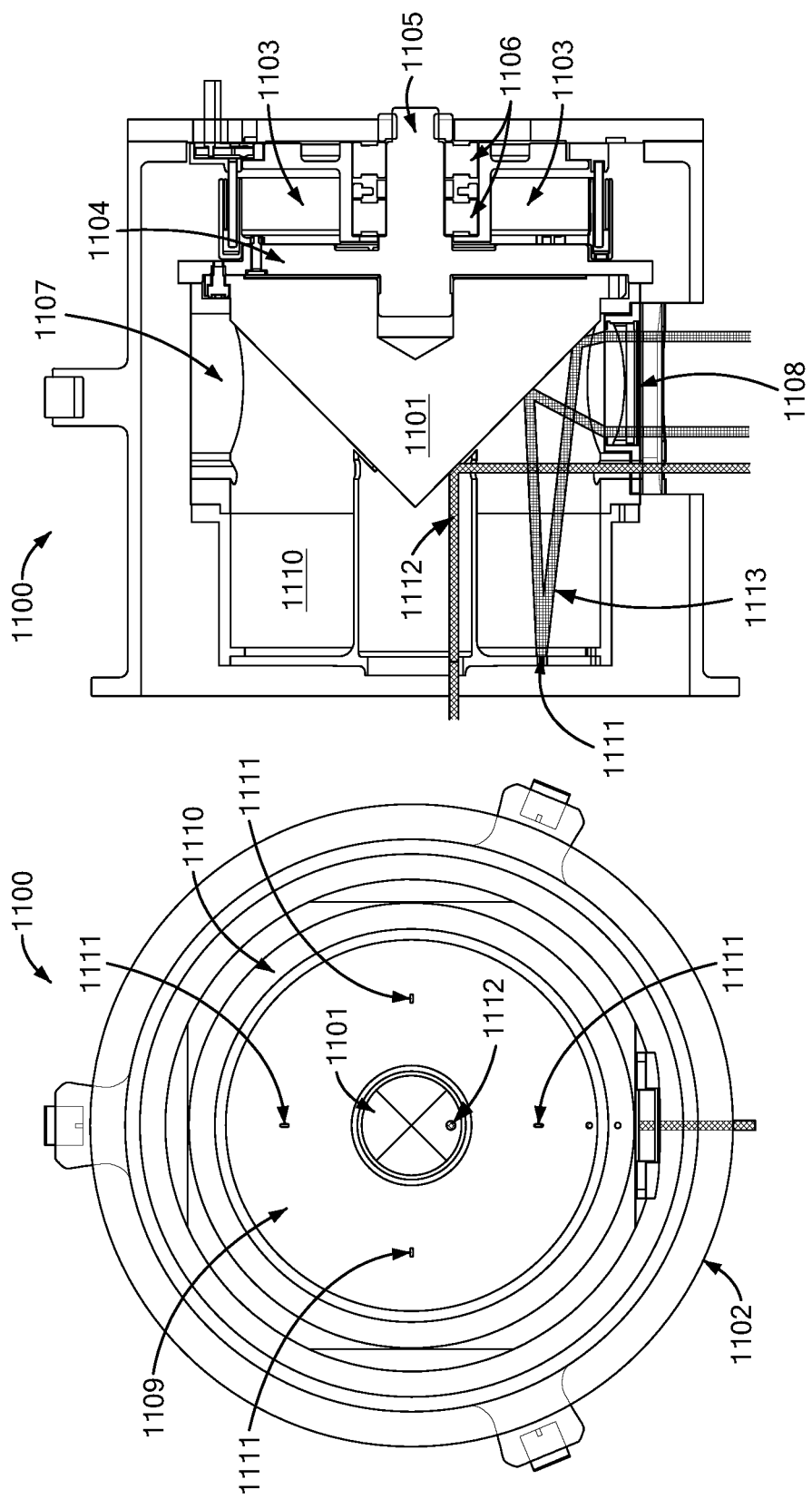
FIG. 11 shows an example monostatic scanner having a common transmit and receive pyramid mirror.

FIG. 11 shows an example monostatic scanner 1100 having a common transmit and receive pyramid mirror 1101. In embodiments, the scanner section has a fixed (non-rotating) main housing 1102. A thin ring motor assembly 1103 attaches to the main housing. The motor 1103 attaches to a rotating optics assembly via a mounting plate 1104, shaft 1105, and bearing set 1106. The optics assembly includes a housing 1107, the four-faceted pyramid mirror 1101, a receiver optics cartridge 1108 for each mirror facet, and an aperture slit plate 1109 mounted on a tube 1110. The slit plate has four slightly elongated pinholes 1111, one at each mirror facet focal plane. The transmit beam 1112 and received ray bundle envelop 1113 paths through the scanner are shown in FIG. 11 and detailed further in FIG. 12.

Figure 12:
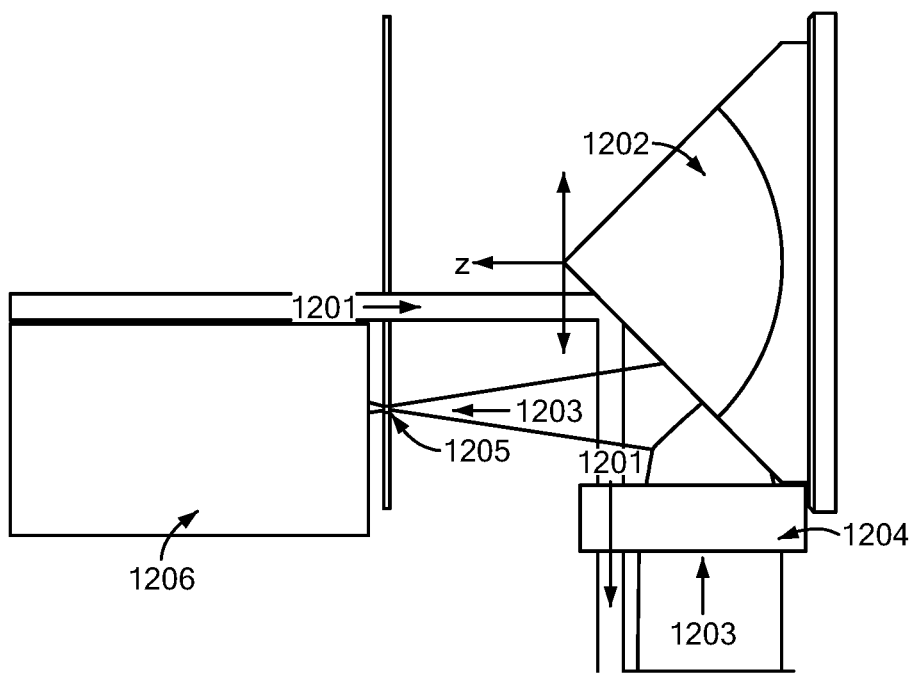
FIG. 12 shows a transmitted laser beam directed onto the surface of a pyramid mirror a small distance away from the apex.

In operation, the scanner is brought to the desired rotation rate (e.g., up to 4000 RPM) and the pulsed laser begins transmitting at a pre-determined PRF. FIG. 12 shows that a transmitted beam 1201 is directed onto the surface of the pyramid mirror 1202 a small distance away from the apex. The beam 1201 reflects 90 degrees downward toward the ocean bottom or imaging plane. The beam reflects off the bottom (generally in a more or less Lambertian manner) and the return 1203 that falls within the collecting area of the cartridge-based receiver optics 1204 is focused into the slit plate hole 1205 associated with the facet off which the transmit beam was reflected. The mirror and the slit plate rotate together to create the "pencil beam-pinhole" architecture characteristic of the monostatic LLS architecture.

Figure 13:
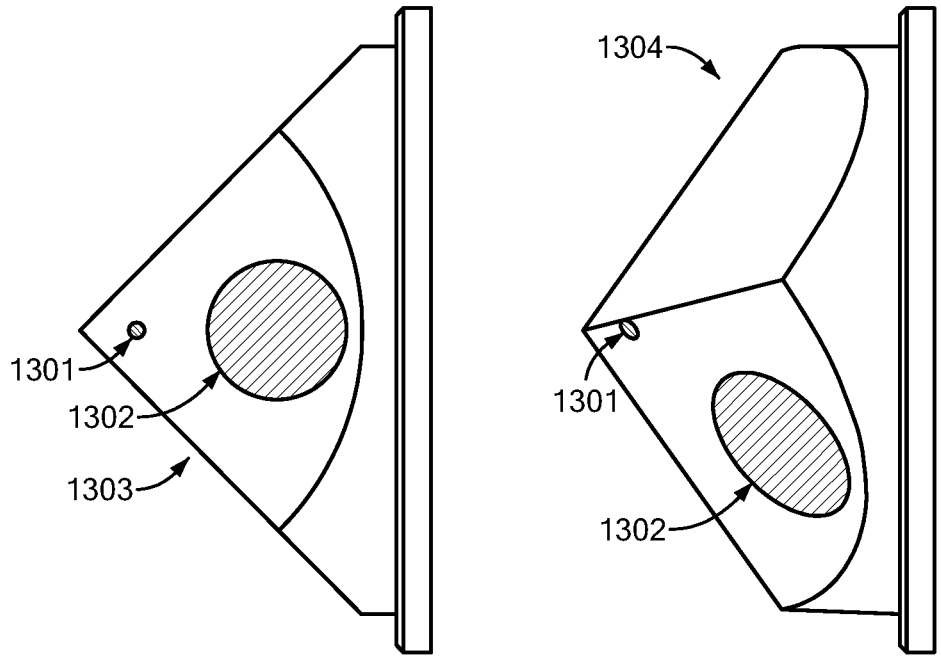
FIG. 13 shows the locations of a transmit beam and the received return ray bundle on a pyramid scan mirror for on-axis (e.g. down-look) and 35 degree off-axis imaging.

FIG. 13 shows example locations of the transmit beam 1301 and the received return ray bundle 1302 on the pyramid scan mirror for on axis (e.g. down-look) 1303 and 35 degree off-axis 1304 imaging. For a compact imager compatible with a ~12" diameter AUV/UUV platform, the base of the scan mirror will be approximately 5" and the separation between the transmitted and received beam will be approximately 1.125" at the focal point of the received beam (1205 in FIG. 12).

Figure 14:
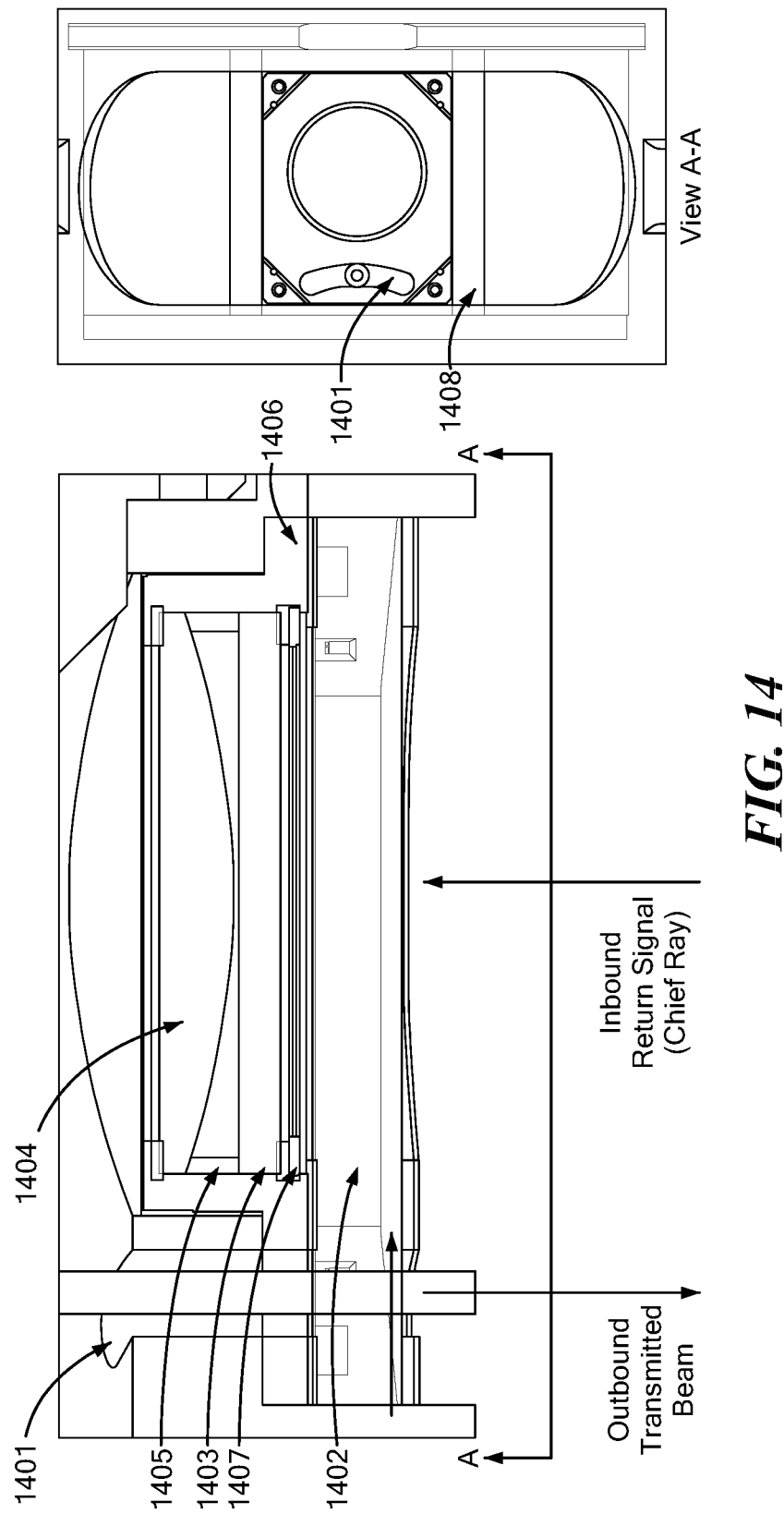
FIG. 14 shows example cartridge-based receiver optics.

FIG. 14 shows an example embodiment of the cartridge-based receiver optics referenced in FIG. 12 (1204). The rotating optics housing shown in FIG. 11 (1107) has four optical ports, one for each of the four pyramid mirror facets. Each optical port includes an opening 1401 for the transmit beam to pass through as well as a set of receiver optics. The receiver optical components include a corrective lens 1402 (if needed to compensate for a non-flat window to the outer environment), a narrow band (1-2 angstroms depending on the spectral linewidth and stability of the laser) solar filter 1403, and a focusing lens 1404. The solar filter and focusing lens are separated by a spacer 1405 and secured in a removable cartridge 1406 by a retaining clip 1407. The corrective lens is held in place with a lens clip 1408.

In embodiments, the 3D PTR LLS detector includes a PMT, a PMT Bias Network, a digitizer/signal processor (e.g., with an FPGA to support system timing and signal processing), and a High Voltage Power Supply (HVPS). The PMT Bias Network can include a conventional bias Network supported by a COTS HVPS or a custom Active Gated Bias Network (AGBN) supported by a network of power supplies. As mentioned earlier, example embodiments may support high quality 3D imaging with a 1 W blue-green laser at up to 4.5-5.5 BALs depending on standoff range. A custom PMT AGBN approach may support imaging at up to 6 BALs at shorter standoff ranges.

As shown above in FIG. 12, the return signal passes through the aperture slit plate pinhole 1205 and into the PMT 1206. The PMT's photosensitive cathode converts the return photons into an electron cloud that is accelerated through and amplified by the PMT's dynode chain. The voltages that accelerate the electrons between dynode plates and that provide stored charge for signal amplification are supplied by the HVPS acting through the PMT's bias network. The electrons accelerated off the final dynode stage are gathered by the PMT's anode and converted to an output current. This current passes through a shunt resister resulting in a voltage that is converted to a digital signal by the COTS digitizer.

Figure 15:
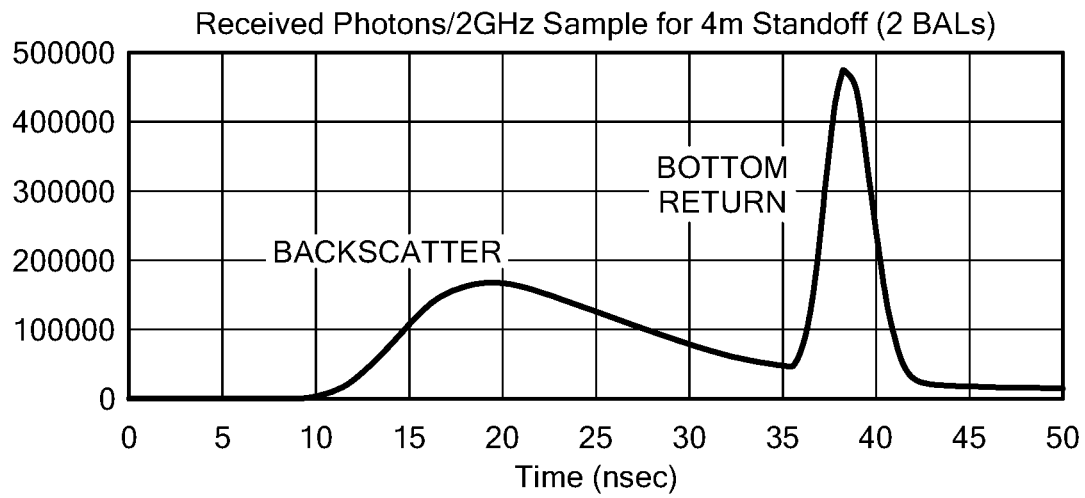
FIG. 15 shows example modeling results for photons received in 2 GHz increments at a standoff range of 4 m in two different water turbidities.
Figure 15:
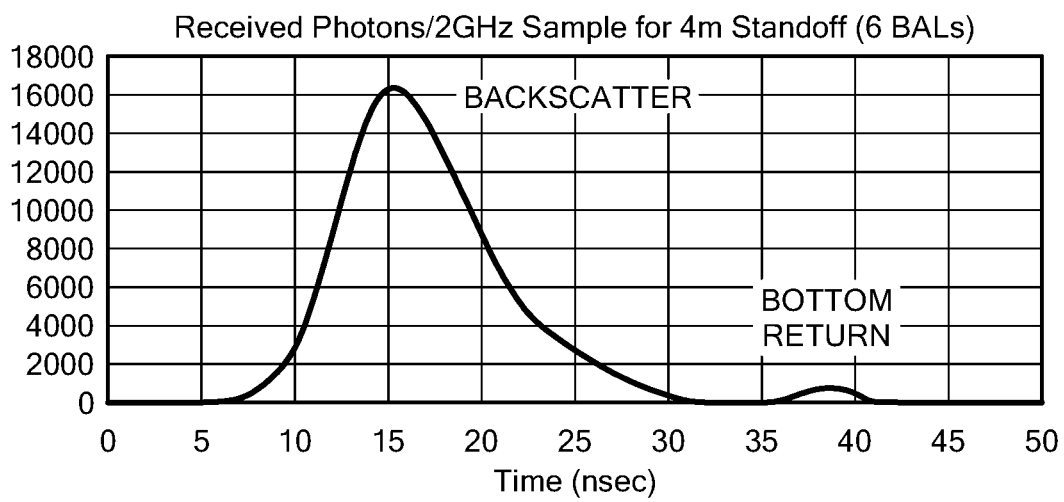

The received signal (for each individual laser pulse) includes primarily backscatter return from the water column and the return from the ocean bottom and/or object being imaged, which includes both non-scattered and small angle scattered photons. The relative amplitude ratio and timing of these components depend on water turbidity and imaging standoff range. FIG. 15 shows modeling results for the photons received in 2 GHz increments at a standoff range of 4 m in two different turbidities. The top plot in which bottom return dominates is for median littoral waters (2 m beam attenuation length). The bottom plot in which backscatter dominates is for a very turbid littoral water (0.67 m beam attenuation length) case.

FIG. 15 illustrates substantial signal variation in two commonly encountered coastal water conditions. Yet more variability occurs if the standoff imaging range and the scan angle (−35 to +35 degrees) are also varied. The bottom plot in FIG. 15 is an example of an imaging condition that would benefit from PMT gating as introduced in the FIG. 9 discussion above. In this case, close range turbid water imaging at 6 BALs, the nearfield backscatter peak and total energies dominate those of the bottom return. Without gating, the PMT gain would be kept low to avoid operating the PMT above its maximum average anode current level and the bottom return signal would receive little if any amplification and would be subject to signal-to-noise limitations. With gating, the voltage differential between the photosensitive cathode and the first dynode would be momentarily reduced, resulting in a reduction in nearfield backscatter photoelectrons that get accelerated and thereby amplified through the PMT dynode chain. This reduces the PMT average anode output current enabling substantially more PMT gain to be applied thus increasing the bottom return signal above the non-PMT sourced system noise level and thereby increasing the range at which imaging can occur in more turbid water conditions. PMT gating has been experimentally demonstrated but is not included in embodiments.

Figure 16:
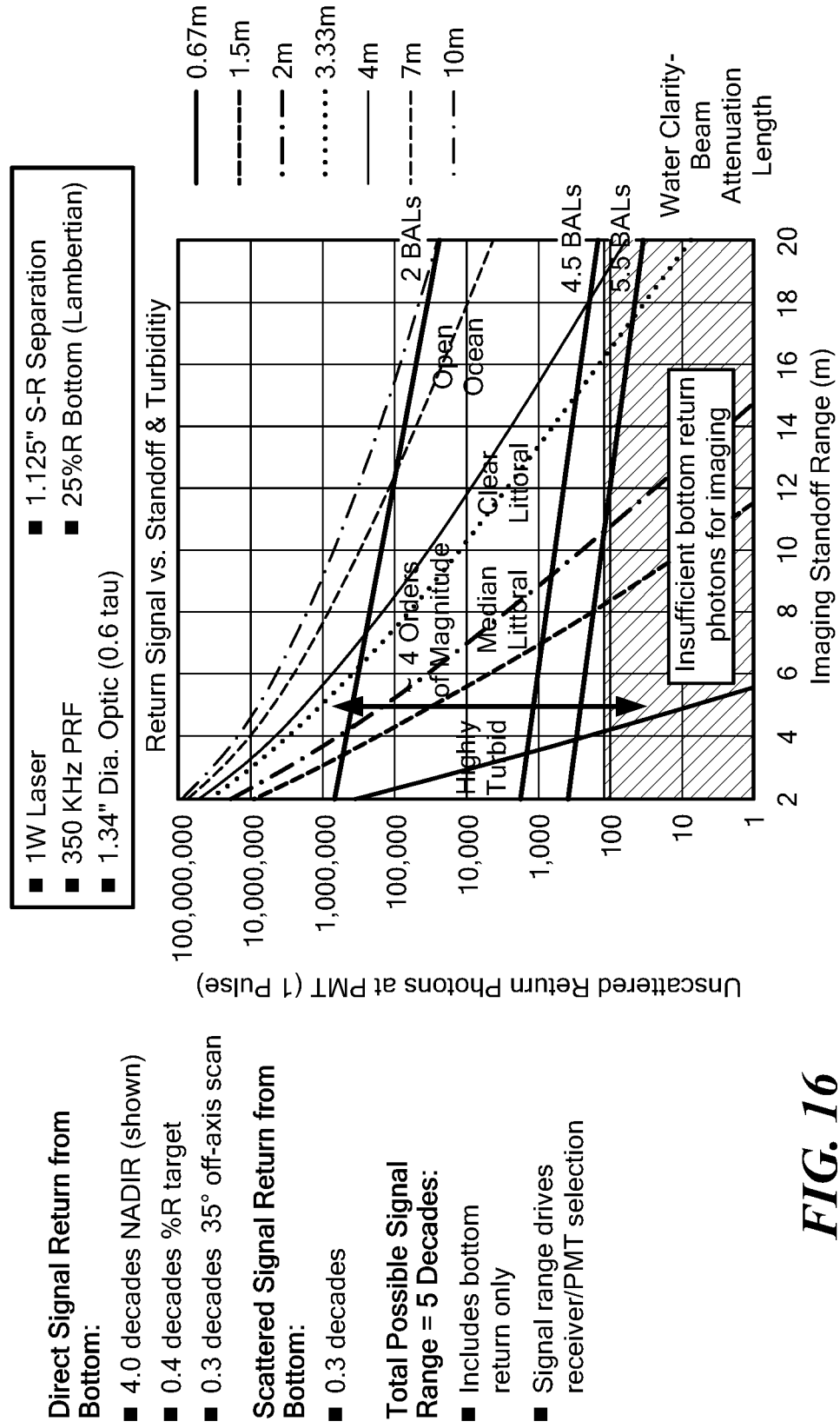
FIG. 16 shows the range of non-scattered bottom return photons per pulse over a broad set of operating water conditions.
Figure 17:
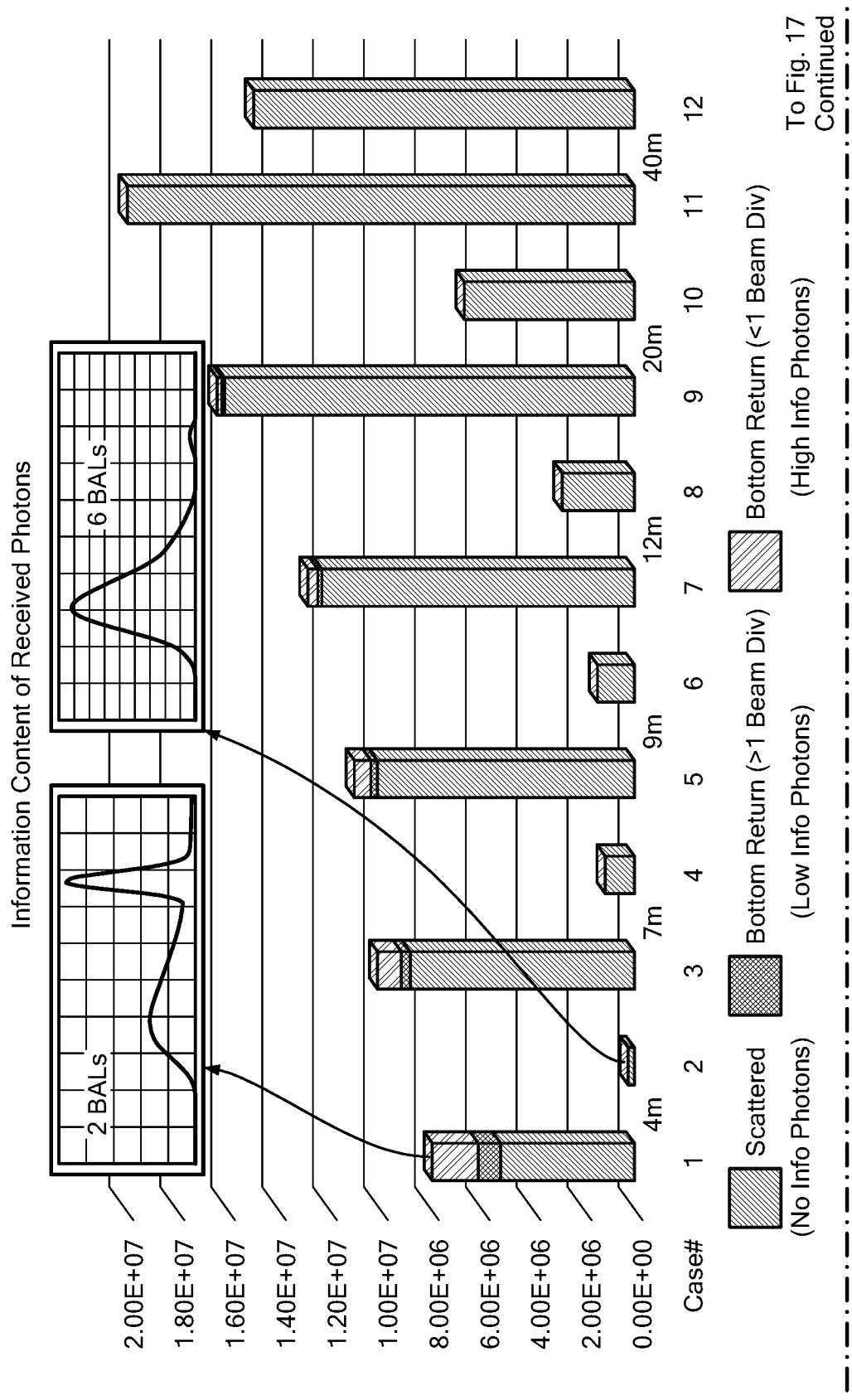
FIG. 17 compares the backscatter return with the information-containing bottom return over a similarly broad set of operating conditions.

FIG. 16 presents the range of non-scattered bottom photons per pulse over a broad set of operating conditions and shows that at least 5 decades of signal range need to be managed to cover those conditions. FIG. 17 compares the backscatter return with the information-containing bottom return over a similarly broad set of operating conditions.

In embodiments, the selection of the PMT, the bias network, the HVPS, and the digitizer depend on what operating sub-space the Monostatic 3D PTR LLS sensor is required to image in for any given application. Factors to consider include a requisite PMT gain range, and automation of the PMT gain control, and application of sufficient power to the PMT dynode chain to prevent bottom return signal droop after amplifying a dominant backscatter return. Automating the PMT gain control can include matching the PMT output signal range with the digitizer input voltage range to avoid saturation of the backscatter and/or bottom return signals and allowing for sudden changes in the bottom return reflectance (e.g. from the sudden appearance of a high contrast object of interest). Automating PMT gain control can further include preventing PMT damage (e.g. by exceeding the average anode current limit and/or peak current limit for an extended period of time as can happen when over-amplifying backscatter to "see" the bottom return). The information contained in FIG. 15, FIG. 16, and FIG. 17 combined with the design guidance above provide example guidance to select components for 3D PTR LLS detector embodiments that meet the needs of a particular application.

In operation and referring back to FIG. 15, signal processing is employed to extract a range and an amplitude value from each pulse time return waveform. These values may constitute a single pixel's worth of data. The data from sequential pixels and the associated scan angles at which they occurred can then be formatted into a waterfall display line. Four display lines, for example, are generated from each physical rotation of the scan mirror, with each line parallel to but slightly displaced from the previous line in the direction of platform motion. This permits a waterfall imagery display of the range and/or amplitude data. It also permits a display of 3-dimensional imagery that can be very useful for object identification.

In embodiments, range and amplitude information may be extracted from the 3D PTR LLS time return waveforms. Example embodiments are configured to extract bottom return amplitude and range information from 2048-sample laser pulse time return sequences, for example. In embodiments, a calculation sequence is performed for pulse time return sequences received in the active imaging portion of the scan line (e.g., central 70 degrees).

Example inputs include:
Altitude[m]: platform altitude above bottom in meters (from UUV/AUV)

Example constants include:
ADC_Sample_Rate=3.6 Gsps (for this example—actual value depends on digitizing rate)
IoR_H20=Seawater Index of Refraction=1.333
Laser Pulse Width–full width half max (PW)=3 nsec (for example)
Pix_Per_Line=Pixels per Scan Line (derived from operator selected scanner RPM and Laser PRF; corresponds to the central 70 degrees of the return off a single 90 degree pyramid mirror facet)

Example sensor Set-Up variables include:
Up_App_%=Upper Aperture %: determines distance from sensor to begin looking for the bottom return at any current scan angle (e.g. given a platform altitude input of 10 m, a scan angle of 0 degrees/downward, and a Up_App % of 80=>begin looking for object/bottom returns corresponding to an 8 m standoff)
Lower_App_%=Lower Aperture %: determines distance from sensor to stop looking for the bottom return at the current scan angle (e.g. given a platform altitude input of 10 m, a scan angle of 0 degrees/downward, and a Lower_App_% of 110=>stop looking for object/bottom returns corresponding to an 11 m standoff)

In example calculation sequence, for each scan-line pixel, there is extracted a time return sequence of 2048 ADC samples, for example. The first ADC sample in the sequence should be a fixed offset from laser trigger. Alternatively, one could extract only those samples in and around bottom return window that are needed to generate amplitude and range data.

Figure 18:
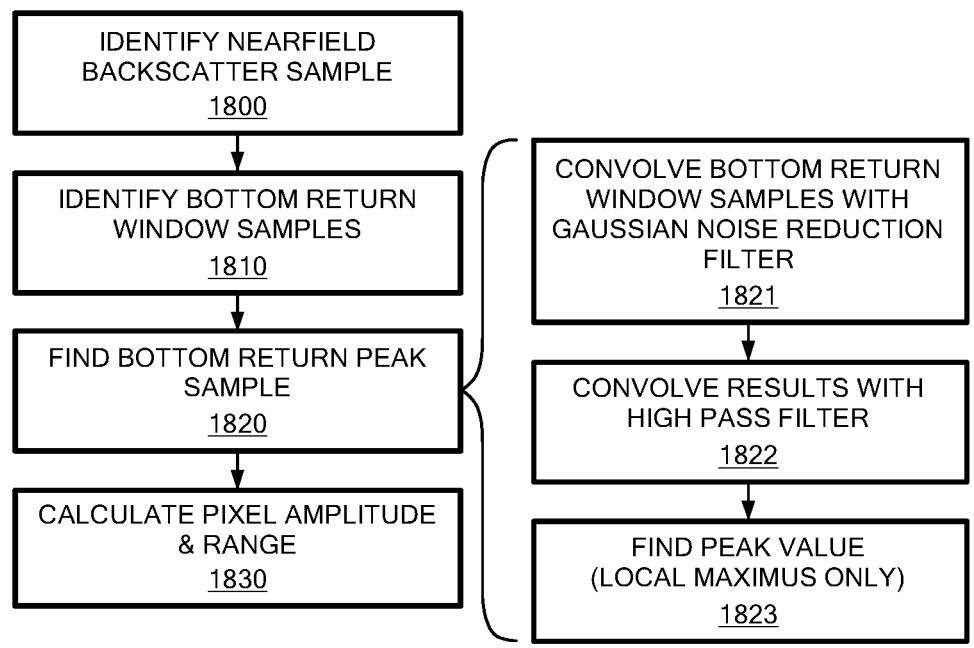
FIG. 18 is a flow diagram of an example approach to processing digitized time return sequences to extract range and amplitude pixel data to support 3D imaging.

FIG. 18 shows an example implementation of the processing required to calculate amplitude and range values from the digitized time return sequences of each laser pulse. In this example, each sequence comprises 2048 digitized samples.

In step 1800, the system identifies the last backscatter sample number, Last_BS_Samp. Example values for return processing are set forth below:
Pix_Num=pixel number associated with time return sequence (e.g. Pix_Num=1 for first pixel at start of 70 degree scan line)
Scan_Width[m]=2*Altitude[m]+tan (70/2)
Pix_GSD[m]=Scan_Width/Pix_Per_Line
Pix_X_Pos[m]=-1*Scan_Width/2+ (Pix_Num-1)*Pix_GSD
Pix_Ang[rad]=atan (Pix_X_Pos/Altitude)
Last_BS_Time[nsec]=((Up_App_%/100)*1e9*(2*Pix_X_Pos/sin (Pix_Ang)))/(3e8/IoR_H2O)
Last_BS_Samp=int((Last_BS_Time+Pulse_Width)*ADC_Sample_Rate+0.5)

In step 1810, the system identifies the bottom return window samples, as set forth below:
First_Bottom_Sample=Last_BS_Sample+int(pulse width*ADC_Sample_Rate+0.5)
Last_Bottom_Sample=int ((((Lower_App_%/100)*1e9* (2*Pix_X_Pos/sin (Pix_Ang)))/(3e8/IoR_H2O)) *ADC_Sample_Rate+0.5)

In step 1820, the system finds the bottom return peak ADC sample. In step 1821, the system convolves the bottom return window ADC samples with a pre-calculated Gaussian filter for noise reduction, as set forth below:

Set the filter kernel half-width to the number of ADC samples in the laser pulse width Full-Width-Half-Max (FWHM); e.g. for a 3 nsec pulse width and a 3.6 Gsps digitizer sampling rate, the half-width is: int (3 nsec*3.6 Gsps+0.5)=11 samples
Set the filter kernel size=half width*2+1=23 samples for this case
Calculate the Gaussian function with +/-1 sigma corresponding to the central 50% of the kernel size.
Normalize the Gaussian filter weights so they sum to 1
Convolve the kernel with the bottom return ADC samples; begin the convolution with the kernel centered on the ADC value of the First_Bottom_Sample and finish with the kernel centered on Last_Bottom_Sample
Retain this filtered data sequence as it is the input to the Range & Amplitude Extraction process In step 1822, the system convolves the Gaussian filtered bottom return window ADC samples with a high pass filter to reduce the impact of nearfield backscatter roll-off on bottom return peak finding, as set forth below:
Set the averaging window half-width to 1.5× the number of ADC samples in the laser pulse width FWHM (e.g. for a 3 nsec pulse width and a 3.6 Gsps digitizer sampling rate, the window half-width is: int (1.5*3 nsec*3.6 Gsps+0.5)=17 samples)
The averaging window size=half width*2+1=35 samples for this case
For each Gaussian-filtered ADC sample value in the bottom return window, center the averaging window on that sample, calculate the average of all samples in the averaging window, and subtract that value from the current sample. This is the Gaussian and high-pass filtered ADC sample value In step 1823, the bottom peak ADC sample number is found as set forth below:
Bottom_Pk_Samp=find the sample with the largest Gaussian high-pass filtered value within the bottom return window
Confirm the peak is a local maxima and not on the falling slope of the backscatter. If not, use $2^{nd}$ highest peak Referring again to FIG. 18, in step 1830, the system extracts pixel value and range information. In example embodiments, the system fits a $2^{nd}$ Order Polynomial ($y=ax^2+bx+c$) to the N Gaussian filtered ADC output values (from step 1821) centered on or about the bottom return peak, where N=nearest odd number to: int (Pulse_Width*ADC_Samp_Rate+0.5); Pulse_Width=3 ns; n=#ADC Gsps=3.6. The system can calculate the curve fit coefficients (a, b, c) using equations below where: x is the sample number from the time return sequence of 2048 ADC samples and y is the corresponding ADC raw amplitude.

D=n*sumx2*sumx4+2*sumx*sumx2*sumx3-sumx2^3-sumx^2*sumx4-n*sumx3^2
a=(n*sumx2*sumx2y+sumx*sumx3*sumy+ sumx*sumx2*sumxy-sumx2^2*sumy- sumx^2*sumx2y-n*sumx3*sumxy)/D
b=(n*sumx4*sumxy+ sumx*sumx2*sumx2y*sumx2*sumx3*sumy- sumx2^2*sumxy-sumx*sumx4*sumy- n*sumx3*sumx2y)/D
c=(sumx2*sumx4*sumy+sumx2*sumx3*sumxy+ sumx*sumx3*sumx2y-sumx2^2*sumx2y- sumx*sumx4*sumxy-sumx3^2*sumy)/D In example embodiments, the system then extracts the peak value and the range from the curve fit coefficients:
Peak Amplitude (counts)=$c-b^2/4a$
Range (meters)=(12/39.37)*(-b/2a)*(0.2778)/(2*1.333)

Figure 19:
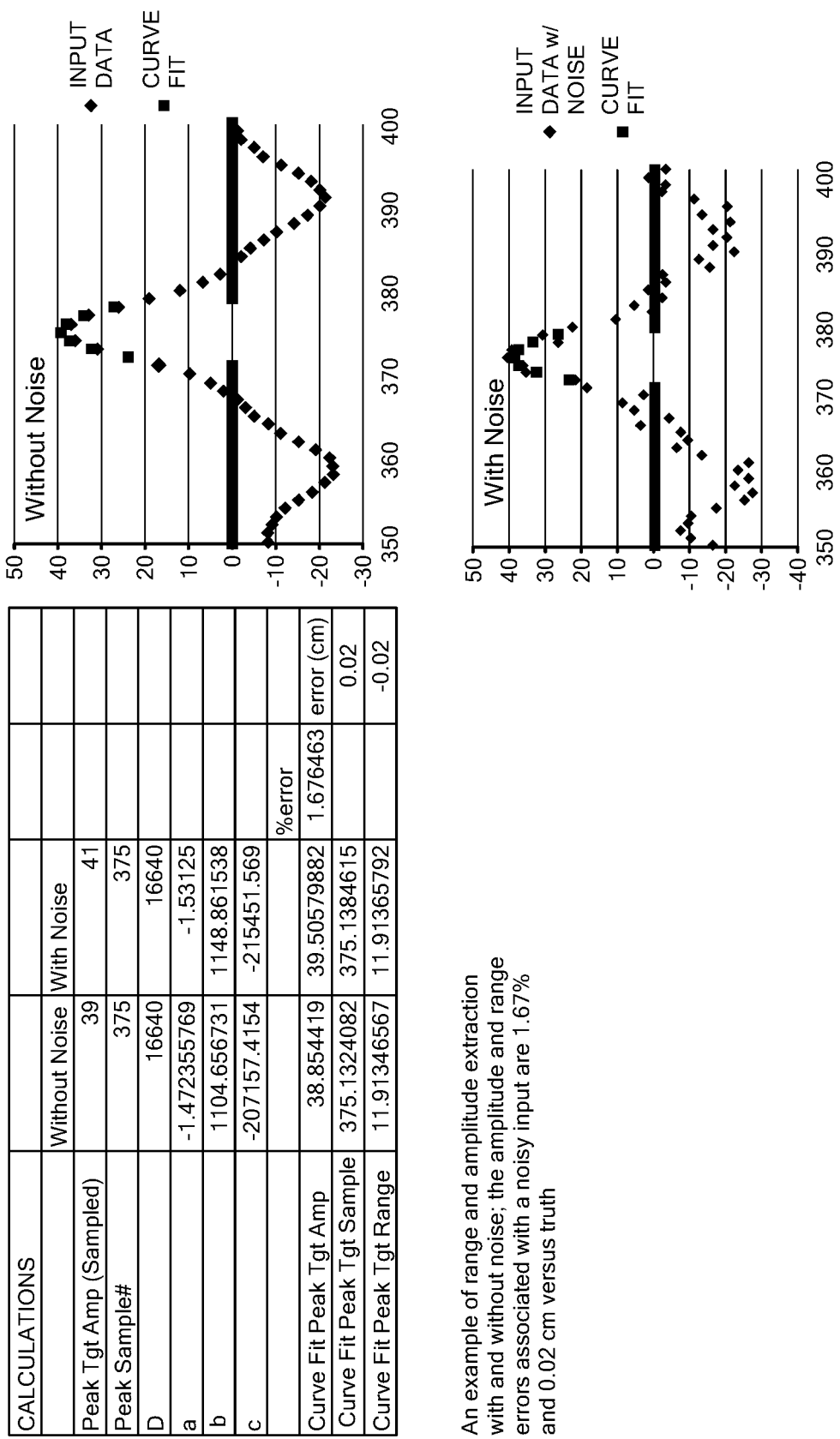
FIG. 19 shows an example of the range and amplitude processing with and without scattering noise.

FIG. 19 presents an example of the range and amplitude processing with and without notional system and scattering noise.

Figure 20:
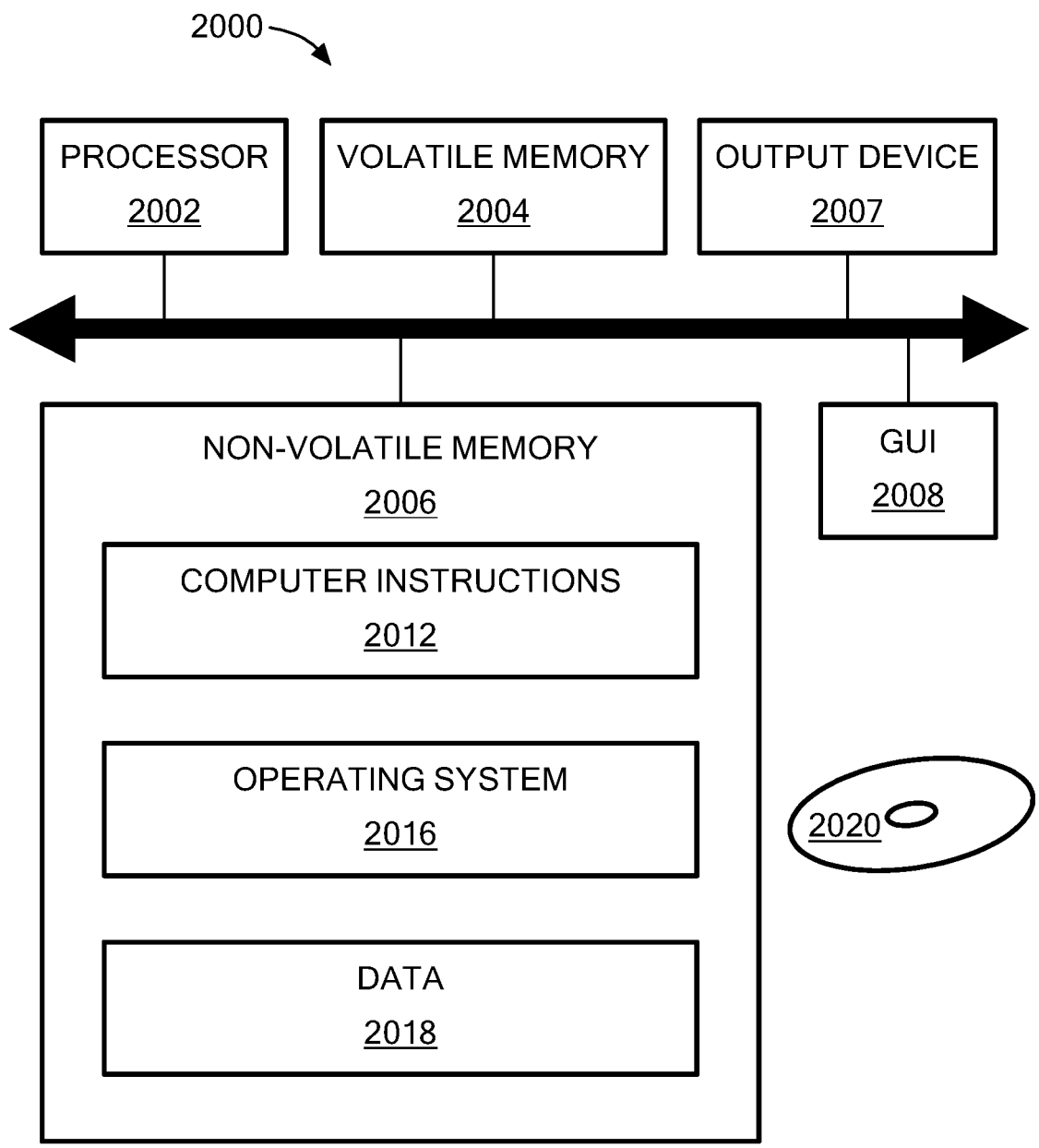
FIG. 20 is a schematic representation of an example computer than perform at least a portion of the processing described herein.

FIG. 20 shows an exemplary computer 2000 that can perform at least part of the processing described herein. The computer 2000 includes a processor 2002, a volatile memory 2004, a non-volatile memory 2006 (e.g., hard disk), an output device 2007 and a graphical user interface (GUI) 2008 (e.g., a mouse, a keyboard, a display, for example). The non-volatile memory 2006 stores computer instructions 2012, an operating system 2016 and data 2018. In one example, the computer instructions 2012 are executed by the processor 2002 out of volatile memory 2004. In one embodiment, an article 2020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A three-dimensional laser line scan imaging system having a field of view (FOV), the system comprising:
   a pulsed laser transmitter configured to illuminate the FOV;
   a rotatable optical scanner comprising:
      a pyramidal mirror configured to reflect transmitted laser pulses to a target in the FOV and to reflect signal return from the target in the FOV, wherein the pyramidal mirror comprises a plurality of facets; and
      a rotating housing having a plurality of optical ports, one for each facet of the pyramidal mirror;
   a photo-multiplier tube (PMT)-based detector configured to detect the signal return and generate a PMT output; and
   a processor and memory configured to process the PMT output.

2. The system according to claim 1, wherein the system is contained within an unmanned/autonomous underwater vehicle.

3. The system according to claim 2, wherein the unmanned/autonomous underwater vehicle has an outer diameter of at least 12.75".

4. The system according to claim 1, wherein:
   the pyramidal mirror comprises a single four-facet pyramidal mirror; and
   the rotating housing comprises four optical ports.

5. The system according to claim 1, wherein each of the facets and the ports supports separate and non-overlapping optical paths for both an outgoing transmit beam and an incoming optical return ray bundle.

6. The system according to claim 1, wherein the processor is configured to extract range and amplitude pixel data from the PMT output to form 3D images of the target.

7. The system according to claim 6, wherein the target comprises a sea floor.

8. The system according to claim 6, wherein the 3D images are formed from time-sequential digitized samples of the PMT output corresponding to the signal return from each transmitted laser pulse.

9. The system according to claim 1, wherein the FOV has a scan width of up to at least 70 degrees.

10. The system according to claim 1, wherein at least one of a laser pulse repetition frequency (PRF), a rotation rate of the optical scanner, or a divergence rate of the pulsed laser transmitter is selected to avoid saturation of at least one of a backscatter signal return or a bottom signal return.

11. The system according to claim 1, wherein at least one of a pulse duration, a pulse-to-pulse uniformity, or a pulse energy of the transmitted laser pulses is selected to avoid saturation of at least one of a backscatter signal return or a bottom signal return.

12. The system according to claim 1, wherein the pulsed laser transmitter comprises a blue-green laser.

13. A method, comprising:
   selecting a field of view (FOV) for a three-dimensional laser line scan imaging system for an unmanned/autonomous underwater vehicle;
   illuminating the FOV with a pulsed laser transmitter;
   employing a rotatable optical scanner to reflect transmitted laser pulses to a target in the FOV and to reflect signal return from the target in the FOV, wherein the rotatable optical scanner comprises:

a pyramidal mirror configured to reflect the transmitted laser pulses to the target and to reflect the signal return from the target, wherein the pyramidal mirror comprises a plurality of facets; and a rotating housing having a plurality of optical ports, one for each facet of the pyramidal mirror;

employing a photo-multiplier tube (PMT)-based detector to detect the signal return and generate a PMT output; and processing the PMT output.

14. The method according to claim 13, wherein:
the pyramidal mirror comprises a single four-facet pyramidal mirror; and
the rotating housing comprises four optical ports.

15. The method according to claim 13, wherein each of the facets and the ports supports separate and non-overlapping optical paths for both an outgoing transmit beam and an incoming optical return ray bundle.

16. The method according to claim 13, wherein processing the PMT output comprises extracting range and amplitude pixel data to form 3D images of the target.

17. The method according to claim 16, wherein the 3D images are formed from time-sequential digitized samples of the PMT output corresponding to the signal return from each transmitted laser pulse.

18. The method according to claim 13, wherein at least one of a laser pulse repetition frequency (PRF), a rotation rate of the optical scanner, or a divergence rate of the pulsed laser transmitter is selected to avoid saturation of at least one of a backscatter signal return or a bottom signal return.

19. The method according to claim 13, wherein the pulsed laser transmitter comprises a blue-green laser.

20. A three-dimensional laser line scan imaging system having a field of view (FOV), the system comprising:
a means for transmitting laser pulses to illuminate the FOV;
a means for scanning comprising:
a pyramidal mirror configured to reflect the transmitted laser pulses to a target in the FOV and to reflect signal return from the target in the FOV, wherein the pyramidal mirror comprises a plurality of facets; and
a rotating housing having a plurality of optical ports, one for each facet of the pyramidal mirror;
a detector means for detecting the signal return and generating a photo-multiplier-tube (PMT) output; and
a processing means for processing the PMT output.

21. The system according to claim 1, wherein:
the rotatable optical scanner further comprises an aperture slit plate having elongated pinholes, one at a focal plane of each facet; and
the pyramidal mirror, the rotating housing, and the aperture slit plate are configured to rotate together.

* * * * *